United States Patent [19]
Barron et al.

[11] Patent Number: 5,680,391
[45] Date of Patent: Oct. 21, 1997

[54] ARRANGEMENT FOR TESTING TELEPHONE SUBSCRIBER LINE CIRCUIT VIA B-ISDN CHANNEL LINKING CENTRAL OFFICE TEST SYSTEM AND METALLIC CHANNEL UNIT INSTALLED IN DIGITAL LOOP CARRIER REMOTE TERMINAL

[75] Inventors: Joseph E. Barron, Newbury Park; Onofrio Schillaci, Camarillo, both of Calif.

[73] Assignee: Harris Corporation, Melbourne, Fla.

[21] Appl. No.: 492,507

[22] Filed: Jun. 20, 1995

[51] Int. Cl.$^6$ .................................................... H04J 1/16
[52] U.S. Cl. .................................................... 370/241
[58] Field of Search .................................. 370/110.1, 13, 370/17, 14, 15, 58.1, 58.2, 241, 242, 243, 244, 245, 247, 248, 251, 252, 522, 524, 904; 371/20.1, 20.4, 20.5, 28.2; 375/224; 379/5, 27, 28, 29, 213, 94–98

[56] References Cited

U.S. PATENT DOCUMENTS

4,768,188  8/1988  Barnhart et al. ...................... 370/95.3
5,239,535  8/1993  Borm et al. .............................. 370/13
5,442,621  8/1995  Ise et al. ............................. 370/110.1

Primary Examiner—Dang Ton
Attorney, Agent, or Firm—Charles E. Wands

[57] ABSTRACT

A subscriber line circuit test and conditioning arrangement for use with a non-metallic (fiber optic) digital communication path-based digital communication network employs a single (basic rate ISDN) metallic channel unit (BMCU) installed at a site terminating the fiber optic communication path. A BMCU communicates with a central office test system using an auxiliary B-ISDN communication 'test' channel portion (2B+D) channels of the time division multiplexed digital communication DS0 channels. Digital command and response signals are transported by the two ISDN bearer (B) channels and are coupled directly to tip and ring digital signal processors in the central office test system, without the need for intermediate digital-to-analog and analog-to-digital conversion by a metallic channel unit at a central office terminal, and that additionally performed by a central office terminal and central office switch. The data (D) channel is employed to conduct access, calibration and control communications with the metallic channel unit.

24 Claims, 4 Drawing Sheets

ARRANGEMENT FOR TESTING TELEPHONE SUBSCRIBER LINE CIRCUIT VIA B-ISDN CHANNEL LINKING CENTRAL OFFICE TEST SYSTEM AND METALLIC CHANNEL UNIT INSTALLED IN DIGITAL LOOP CARRIER REMOTE TERMINAL

FIELD OF THE INVENTION

The present invention relates in general to telephone circuit conditioning and test systems, and is particularly directed to the use of an auxiliary basic rate integrated services digital network (B-ISDN) channel, that enables subscriber line circuits, coupled to a digital loop carrier remote terminal or optical network unit communicating with a central office via a non-metallic (fiber optic) communication path, to be digitally conditioned and tested directly from the central office test system.

BACKGROUND OF THE INVENTION

Prior to the introduction of non-metallic (fiber optic) link-based digital loop carrier systems, the subscriber circuits served by a telephone central office were conditioned and tested directly via a metallic (copper) wire pair, providing a direct metallic path between test circuitry in the central office and the subscriber circuit. However, as many of those (limited bandwidth and limited range) copper wire cable networks have been replaced and are being replaced by (broadband and extended range) fiber optic systems, there is no longer a readily available continuous metallic link that extends from the test system to the subscriber circuit so as to allow direct testing of the subscriber line circuit from the central office.

Figure 1:
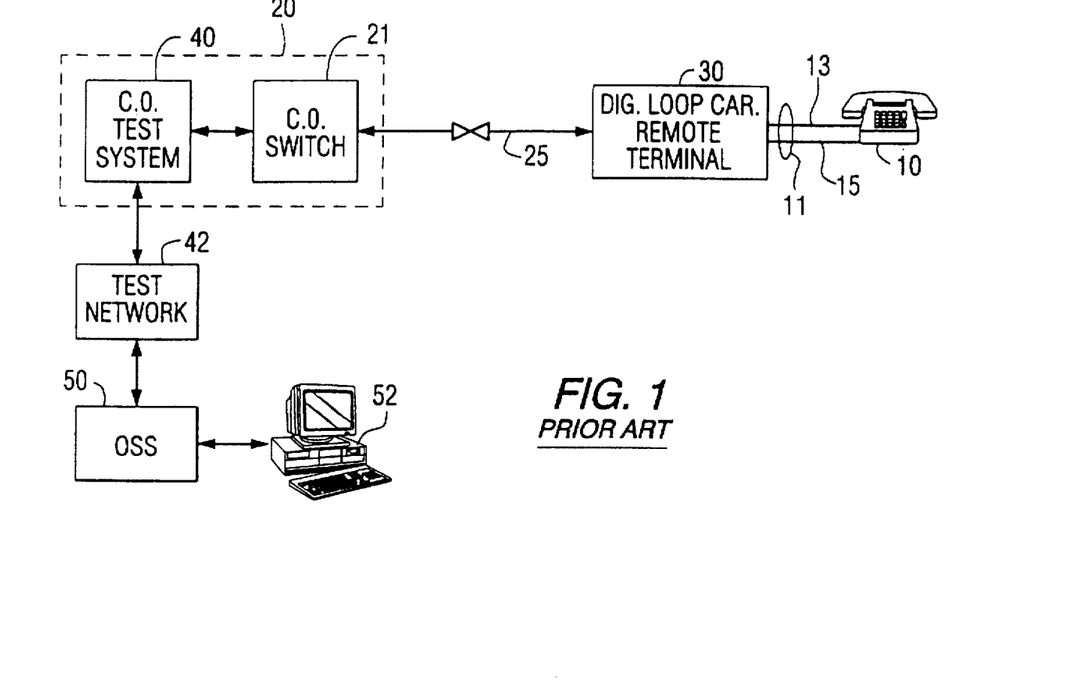
FIG. 1 diagrammatically illustrates a fiber optic telecommunication network of Figure in which subscriber line circuits are served by a central office via a digital loop carrier remote terminal.

This problem is diagrammatically illustrated in the fiber optic network of FIG. 1, wherein subscriber line circuits 10 communicate with a central office 20 through a digital loop carrier remote terminal (DLC-RT) 30, which is coupled to the remote or downstream end of a time division multiplexed (TDM), twenty-four (64 Kb/s) channel (T1 carrier= 1.544 Mb/s) fiber optic link 25, the upstream end of which is sourced from a central office switch 21 in a central office 20. Each of the subscriber line circuits 10 is coupled to the remote terminal 30 via a local metallic (copper wire) pair 11 comprising tip and ring leads 13 and 15, respectively.

The test system of the central office 20, which is designed to conduct prescribed metallic line tests of the subscriber line circuits, includes a central office loop test system 40, coupled to the central office switch 21 and linked through a test network 42 to an operational support system (OSS) 50, having an embedded mechanized loop test system that is controllably accessed and operated via an associated test support terminal 52. Because the TDM communication link 25 from the central office switch 21 to the subscriber line circuits 10 is non-metallic (fiber optic), it is not possible to directly test the subscriber line circuits 10 from the central office loop test system through the fiber path from the central office switch 21.

Figure 2:
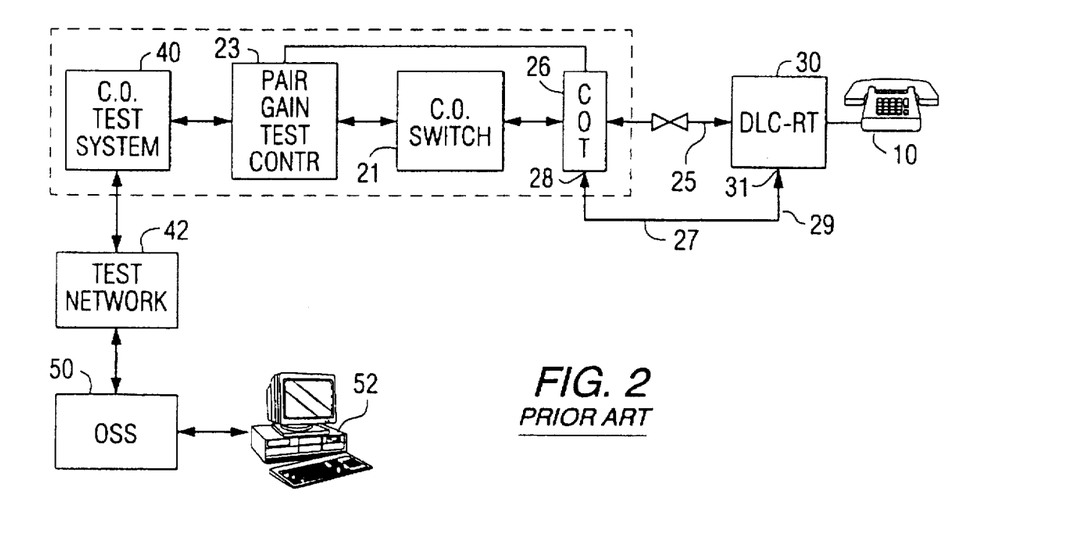
FIG. 2 diagrammatically illustrates a modification of the fiber optic telecommunication network of FIG. 1 to incorporate an auxiliary copper by-pass pair dedicated exclusively for test and conditioning purposes.

FIG. 2 shows an early solution to this problem, wherein telephone service providers installed an 'auxiliary' copper by-pass (Tip/Ring) pair 27, dedicated exclusively for test and conditioning purposes, in a parallel path with the fiber optic cable 25 between the central office 20 and the remote terminal 30. A first, upstream end 28 of the auxiliary metallic pair 27 is terminated at a central office terminal (COT) 26, that links the central office switch 21 with the fiber optic cable 25. The central office terminal 26 is coupled to a pair gain test controller 23 installed between the loop test system 40 and the central office switch 21. A second, downstream end 29 of the auxiliary metallic by-pass pair 27 is terminated at a metallic path access port 31 of the digital loop carrier remote terminal (DLC-RT) 30.

When a subscriber line circuit 10 is to be conditioned or tested (under the control of the operational support system 50), the pair gain test controller 23 is operated by the central office test system, which receives a command from the operational support system 50 instructing it to provide a test link therethrough from the loop test system 40 through the central office terminal 26 to the first end 28 of the auxiliary metallic by-pass path 27. The DLC-RT 30 is also commanded to provide a metallic connection between the subscriber line circuit 10 to be tested and metallic path access port 31, thereby providing a continuous metallic test/ condition link between the loop test system 40 and the subscriber line circuit 10.

In the course of time, however, the scheme of FIG. 2 has proven to be impractical and costly. First, whenever new networks are installed, high bandwidth fiber optic cable is employed exclusively as the communication transport medium, as copper wire is no longer being used for new systems. Moreover, even if copper wire were available, it suffers severe performance degradation over extended distances, making an auxiliary copper by-pass link both hardware-intensive and expensive to install.

To remedy this second problem of not having an auxiliary by-pass copper pair available for test purposes, telephone companies have installed a self-contained mini-test system, known as a remote monitoring unit or RMU, at the remote site housing the DLC-RT 30. In the network diagrammatically illustrated in FIG. 3, an RMU 32 is shown as being coupled to the metallic pair access port 31 of the DLC-RT 30 (to which the auxiliary by-pass pair 27 of FIG. 2 would otherwise be connected). RMU 32 has internal line conditioning and test circuitry that replicates the electrical stimulus applying and response measuring functionality of the loop test system installed in the central office, so that a subscriber line circuit may be completely tested directly from the remote terminal. Communications between the RMU 32 and the supervisory OSS 50 are conducted via an associated modem 34 in the RMU and a modem 52 coupled to the test network 42.

Figure 3:
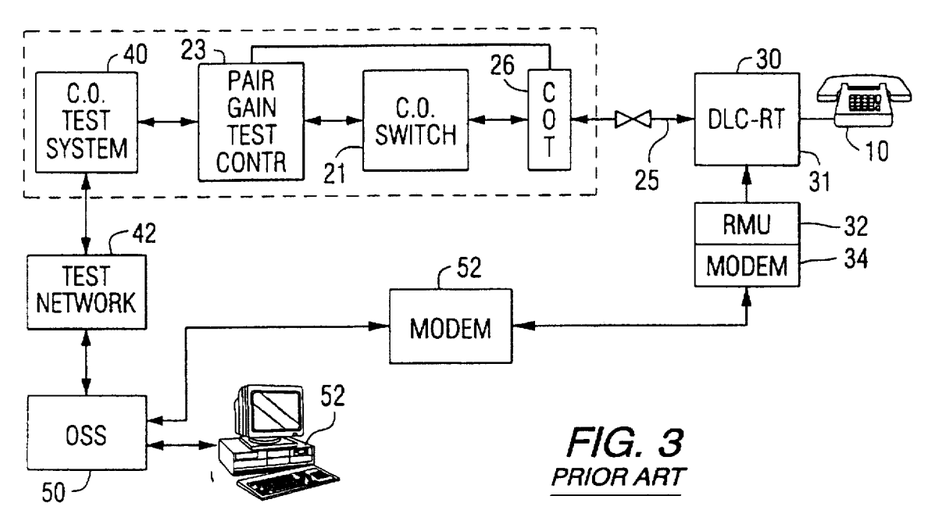
FIG. 3 diagrammatically illustrates the fiber optic telecommunication network of FIG. 1, in which a self-contained mini-test remote monitoring unit is installed at a remote site.

Now, although provisioning a remote site DLC-RT 30 with an RMU 32 enables each subscriber line served by that DLC-RT to be fully tested, such an installation involves overhead that is less than ideal from the telephone service provider's perspective. First, in order to meet 'low budget' cost requirements of the telephone companies, the RMU may employ reduced sophistication signal processing circuitry, which slows down throughput, and therefore increases the amount of time needed to perform a test. This test time lag is enlarged by the fact that access to the RMU requires a dial-up connection from the OSS. A further deficiency, from the telephone service provider's point of view, is the fact that installation of the RMU is more than a simple 'plug-in' operation by the craftsperson; some wiring is required. Finally, since each RMU is capable of testing only those subscriber line circuits served by the remote terminal in which the RMU is installed, the OSS data base must be updated to map the phone numbers of multiple RMUs with those of their associated subscriber line circuits.

In an attempt to overcome the phone companies' perceived shortcomings of installing an RMU with the DLC-RT, a by-pass pair emulation subsystem, as described, for example, in the Kiko U.S. Pat. Nos. 4,852,160 and 5,202, 919, has been proposed. Pursuant to this scheme, rather than implementing the line conditioning and testing functions (by installing an RMU) at the remote site, all of the line stimulus and response measurement functionality is once again retained by the test system in the central office. The problem of the unavailability of an auxiliary by-pass metallic pair to link the test system with the subscriber line circuit is remedied by installing analog-to-digital and digital-to-analog signal processing interfaces, termed metallic channel units or MCUs, in each of the COT of the central office and the DLC-RT at the remote site. This MCU pair communicate with each other by usurping two of the twenty-four available DS0 channels of the multiplexed T1 fiber optic link, for the purpose of exchanging digital signals representative of metallic line test-related signals between the central office test system and the subscriber line circuit metallic (tip and ring) pair to which the metallic channel unit at the remote terminal is coupled.

Figure 4:
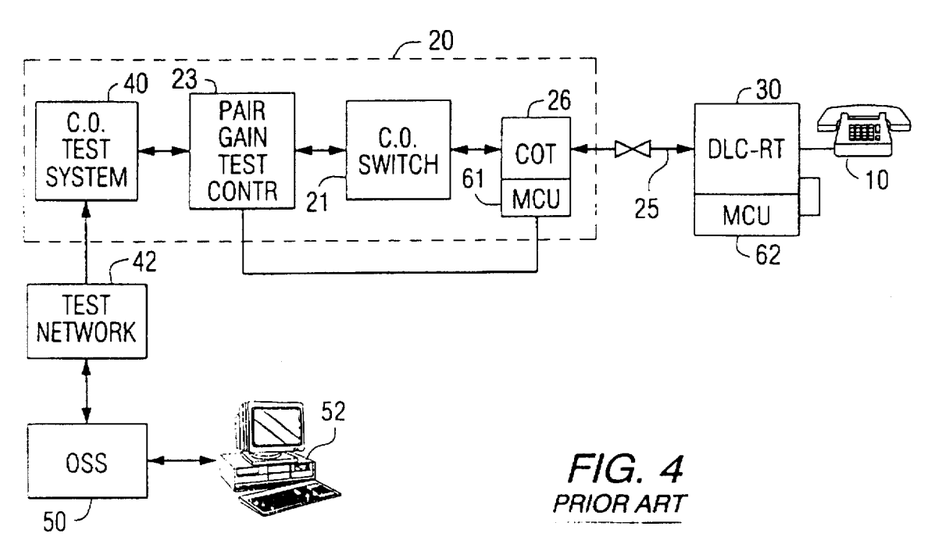
FIG. 4 diagrammatically illustrates a modification of the fiber optic telecommunication network of FIG. 1 to incorporate a by-pass pair emulation scheme comprised of a pair of metallic channel units installed in the COT of the central office and the DLC-RT the remote site, respectively.

The configuration of such a by-pass pair emulating subsystem is diagrammatically illustrated in FIG. 4, as comprising a pair of metallic channel units 61 and 62, that are respectively installed in the COT 26 of the central office 20 and the DLC-RT 30 at the remote site. Using these metallic channel units, conditions on the subscriber line circuits (e.g., voltages and currents), which may be in response to stimuli sourced from central office test system, are digitized by the metallic channel unit at the remote terminal and sent back to the mirrored metallic channel unit at the central office over the usurped two of the twenty-four normally available DS0 channels in the T1 data stream on the fiber optic link. The digital test-associated signals received at the central office terminal are converted into analog format and forwarded to the central office test system 40 for analysis. The central office test system measures the analog-converted signals by first converting the signals into digital format, so that they may processed by digital processing circuitry within the test system, that has been programmed in accordance with a resident mechanized test routine.

Advantages of this dual metallic channel unit approach of FIG. 4 include the fact that separate test network and RMU dial-up modems (corresponding to modems 34 and 42 of FIG. 3) are not required, thereby increasing speed of test access to the subscriber line circuit. Moreover, since all testing is conducted directly from the central office test system, in the same manner as with the auxiliary by-pass pair 27 of FIG. 2, testing throughput is not delayed to the extent that it is using an RMU. In addition, and what is particularly attractive to the telephone service provider, installation of the metallic channel unit pair is relatively simple, in that it entails only card-to-backplane 'plug-in' operations by a craftsperson at each of the COT 26 and the DLC-RT cabinet 30. However, the metallic channel unit or by-pass pair emulation subsystem approach of FIG. 4 suffers from a major impending shortcoming; it is not readily compatible with newer system architectures being installed and developed for the next generation of (broadband) telecommunication networks.

More particularly, as telephone service providers continue to upgrade their equipment, they seek to integrate multiple signal processing capabilities into fewer pieces of hardware. To this end, the telephone industry is currently incorporating the functionality of the central office terminal (COT) directly into an upgraded central office switch, termed an integrated application unit, which is capable of handling digital signalling traffic directly, without the need for analog/digital and digital/analog conversion in the signal transport path through the central office switch. This means that the metallic channel unit 61 that is currently installable in the central office terminal of FIG. 4 will have 'nowhere to go' in a universal application unit. Secondly, the expansion of information distribution systems to embody diversified types of broadband services is leading to a next generation of networks, where fiber to the curb (FTTC) will be the standard and predominantly employed communication path.

Figure 5:
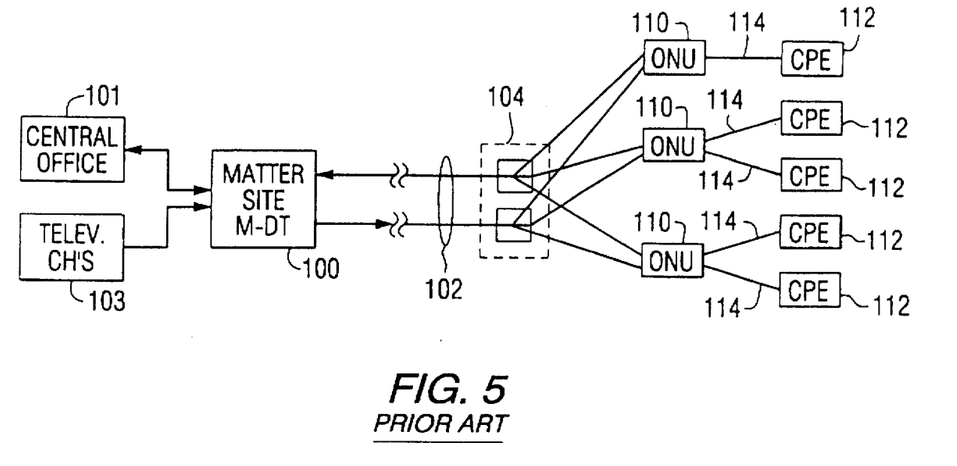
FIG. 5 diagrammatically illustrates a broadband services fiber to the curb (FTTC) telecommunication network.

Such a broadband network is diagrammatically illustrated in FIG. 5 as comprising a host digital terminal (HDT) located at a master site 100, to which digitized telephony signals from a central office 101, as well as data and video channels 103 are supplied. The HDT is linked by means of (T1) fiber optic cables 102 to a plurality of geographically separated, remote site pedestals 104, each housing a digital loop carrier remote terminal.

A respective fiber optic interfacing pedestal 104 at a remote site may include a multiple fan-out, optical splitter device and a multiple feed-in optical combiner device, through which downlink and uplink fiber portions are coupled to a plurality of subscriber interface optical network units 110, that service plural associated customer premise equipment 112 through associated broadband (e.g., 24-T1 channels) service drops 114.

Because of this branched fiber optic network topology, it will be appreciated that, in order to test each subscriber line using the above-described metallic by-pass pair emulation approach of FIG. 4, in addition to the problem of not having an available COT card slot available in an integrated central office switch, as described above, it will also be necessary to install, in each ONU, a respective metallic channel unit card for every T1 line served by that ONU, making the cost of testing subsystem hardware-intensive and prohibitively expensive.

SUMMARY OF THE INVENTION

In accordance with the present invention, the foregoing shortcomings of conventional central office-resident systems for testing and conditioning subscriber line circuits served by a non-metallic (fiber optic) digital communication path-based digital communication network are addressed by means of a new and improved testing arrangement that employs only a single basic rate ISDN metallic channel unit, or BMCU, which is disposed at a site terminating the fiber optic communication path, and contains analog-to-digital conversion circuitry and digital-to-analog conversion circuitry coupled to both the fiber optic path and a metallic tip and ring communication path to the subscriber line circuit.

More particularly, pursuant to the invention, in addition to supporting T1 transmissions, conveying a plurality of TDM DS0 channels associated with a plurality of subscriber line circuits, the fiber optic communication path between the central office test system and the metallic channel unit includes an auxiliary digital communication 'test' channel, in the form of a basic rate integrated services digital network (B-ISDN) channel, that occupies two and a quarter DS0 channels of the time division multiplexed digital communication channels normally allocated for subscriber line circuit communication purposes. The central office loop test system uses this auxiliary ISDN test channel to conduct subscriber line circuit test and response digital communications with the BMCU at the remote site.

In accordance with a preferred embodiment of the invention, the central office test system (COTS) conducts metallic line tests of the subscriber line circuits in response to commands from an operational support system, which contains an embedded mechanized loop test system, that is controllably accessed and operated via an associated test support terminal. Digital representations of test/conditioning stimuli from the central office test system and digital representations of electrical levels of the subscriber line circuits associated with such test/conditioning are transported through the public switched B-ISDN channel, access to which from the central office is incorporated directly into the test system.

In order to access the B-ISDN channel, either at a digital loop carrier remote terminal, or a broadband network in which subscribers are interfaced with an optical network unit, a BMCU is directly plugged into the (remote terminal or optical network unit) backplane, and incorporates a pair of analog-to-digital and digital-to-analog signal processing interfaces. These analog-to-digital and digital-to-analog signal processing interfaces may be of the type employed by the metallic channel units installed at the DLC-RT in the subsystem described in the above-referenced Kiko '160 and '919 patents, so that all test signalling traffic to and from the central office is digitally formatted.

The 16 kb/s data (D) channel portion of the B-ISDN channel is used to control the BMCU at the remote site for access, calibration and control. The BMCU at the remote site responds to digitized stimuli signals received from the central office test system on the two 64 kb/s bearer (B) channel portions of the 2B+D channel and controllably converts these digital signals directly into analog (voltage and current) conditions for application to a designated subscriber line circuit. The respective tip and ring pair responses of the line circuit to these digital-to-analog converted stimuli signals are digitized by analog-to-digital conversion circuitry within the BMCU, and sent back to the central office test system over the two 64 kb/s (B) channel portions of the B-ISDN channel.

At the central office test system, digital response signals transported by the two ISDN bearer B channels from the BMCU are coupled directly to tip and ring digital signal processors, without the need for intermediate digital-to-analog and analog-to-digital conversion by an associated metallic channel unit at a central office terminal, and that additionally performed by a central office terminal and central office switch, thereby providing a significant improvement in performance, cost and speed.

Within the central office test system, the tip and ring digital signal processors are coupled to a main processor. The main processor and an associated control logic unit contain a main test system microprocessor, memory, and communications interface to the OSS. In addition, an analog interface unit provides connections to associated no-test trunks (NTTs) and pair gain test controllers currently employed in central offices. This interface also contains conventional analog signalling transport circuitry to support the testing of plain old telephone system (POTS) equipment, in addition to digital telephone (ISDN) components. The main processor maintains a communication link with its associated OSS by way of a dial up or dedicated data link, and includes associated memory that is updatable remotely, and is preferably programmed to perform self calibration and self diagnostics of the system.

The BMCU itself comprises a B-ISDN channel transceiver respective opto-electronic receiver and electro-optic transmitter components of which are respectively coupled to a balanced feedback arrangement of the amplifier converter circuitry, which essentially corresponds to that employed in the metallic channel unit described in the above-referenced '919 patent. Inputs of respective balanced pairs of digital-to-analog converter circuits respectively associated with the tip and ring leads of the local subscriber loop, convert the two B-channels from the test system into the actual voltage values and currents that are applied by the BMCU to tip and ring leads of the subscriber line circuit under test. Also coupled in the return paths from the tip and ring leads of the subscriber line circuit are analog-to-digital converter circuits that are connected in a balanced configuration with digital-to-analog converter circuits. The BMCU also contains an attendant microcontroller, coupled to the D channel port of transceiver and containing a digital data serial port for providing remote digital communication access for calibrating and conditioning the BMCU.

DETAILED DESCRIPTION

Before describing in detail the new and improved test by-pass test and conditioning communication link emulation scheme of the present invention, that allows subscriber line circuits to be conditioned and tested from the central office test system by way of an auxiliary basic rate integrated services digital network (B-ISDN) channel, it should be observed that the present invention resides primarily in what is effectively a prescribed set of conventional telecommunication signalling hardware components and attendant supervisory microprocessor circuitry therefor, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

Figure 6:
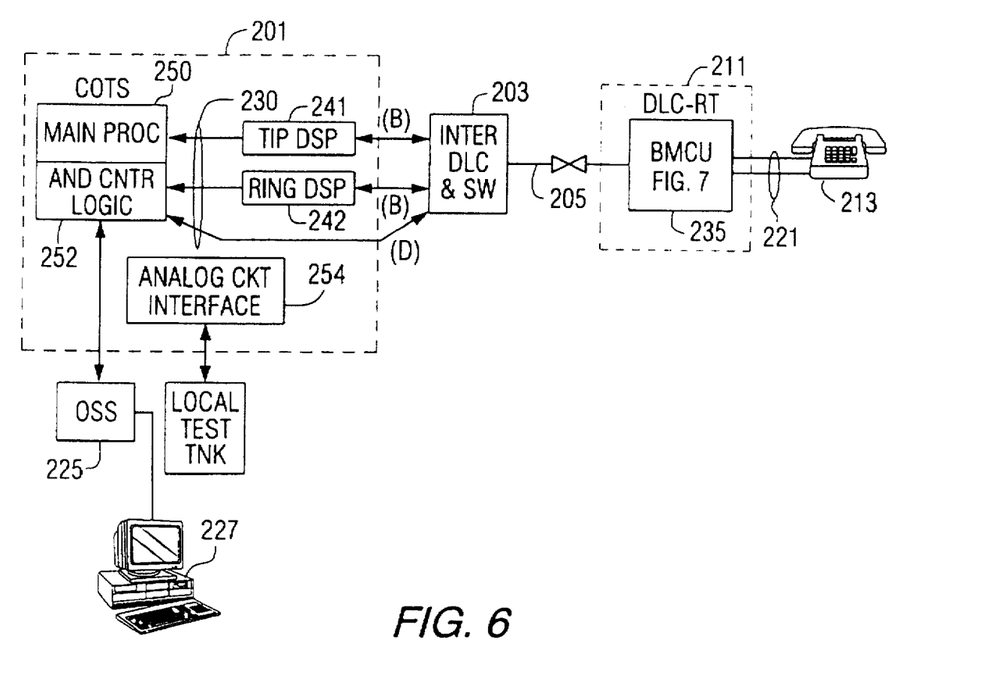
FIG. 6 diagrammatically illustrates a digital loop carrier fiber optic telecommunication network as shown in FIG. 1, but modified to incorporate a B-ISDN channel to emulate an auxiliary by-pass pair for test and conditioning a subscriber line circuit in accordance with the present invention.

FIG. 6 diagrammatically illustrates a digital loop carrier fiber optic telecommunication network, of the type shown in FIG. 1, for example, that has been modified in accordance with the present invention to incorporate an auxiliary B-ISDN channel, for the purpose of emulating an auxiliary by-pass metallic pair for test and conditioning a subscriber line circuit, without having to either install a metallic channel unit in the central office terminal.

As shown in FIG. 6, the test system architecture of the present invention comprises a central office test system 201, which may be coupled to either a universal application unit that is integrated into the central office switch shown at 203, or a central office switch having an associated central office terminal, that terminates one end of a TDM twenty-four (64 Kb/s) channel (T1 carrier=1.544 Mb/s) fiber optic link 205. A second end of the fiber optic link 205 is coupled to a digital loop: carrier remote terminal 211. Digital loop carrier remote terminal 211, which serves a plurality of subscriber line circuits 213, may be coupled to these line circuits directly via local (tip/ring) metallic (copper wire) pairs 221, or via a further fiber optic link to downstream optical network units, to which the subscriber line circuits are coupled, as will be described.

Like the systems of FIGS. 1–5, described above, the central office test system (COTS) 201 of FIG. 6 is configured and programmed to conduct prescribed metallic line tests of the subscriber line circuits 213 in response to commands from an operational support system (OSS) 225, having an embedded mechanized loop test system, that is controllably accessed and operated via an associated test support terminal 227. Pursuant to the present invention, however, digital representations of test/conditioning stimuli from the central office test system 201, on the one hand, and digital representations of electrical levels of the subscriber line circuits 213 associated with such test/conditioning, on the other hand, are transported through a dialed public switched B-ISDN channel 230, access to which from the central office is incorporated directly into the COTS 201, as shown by way of a 2B+D interface port 231. As described above, the dial-up public switched B-ISDN channel occupies two and a quarter DS0 channels of the available twenty-four TDM, DS0 channels transported via the T1 carrier.

Figure 7:
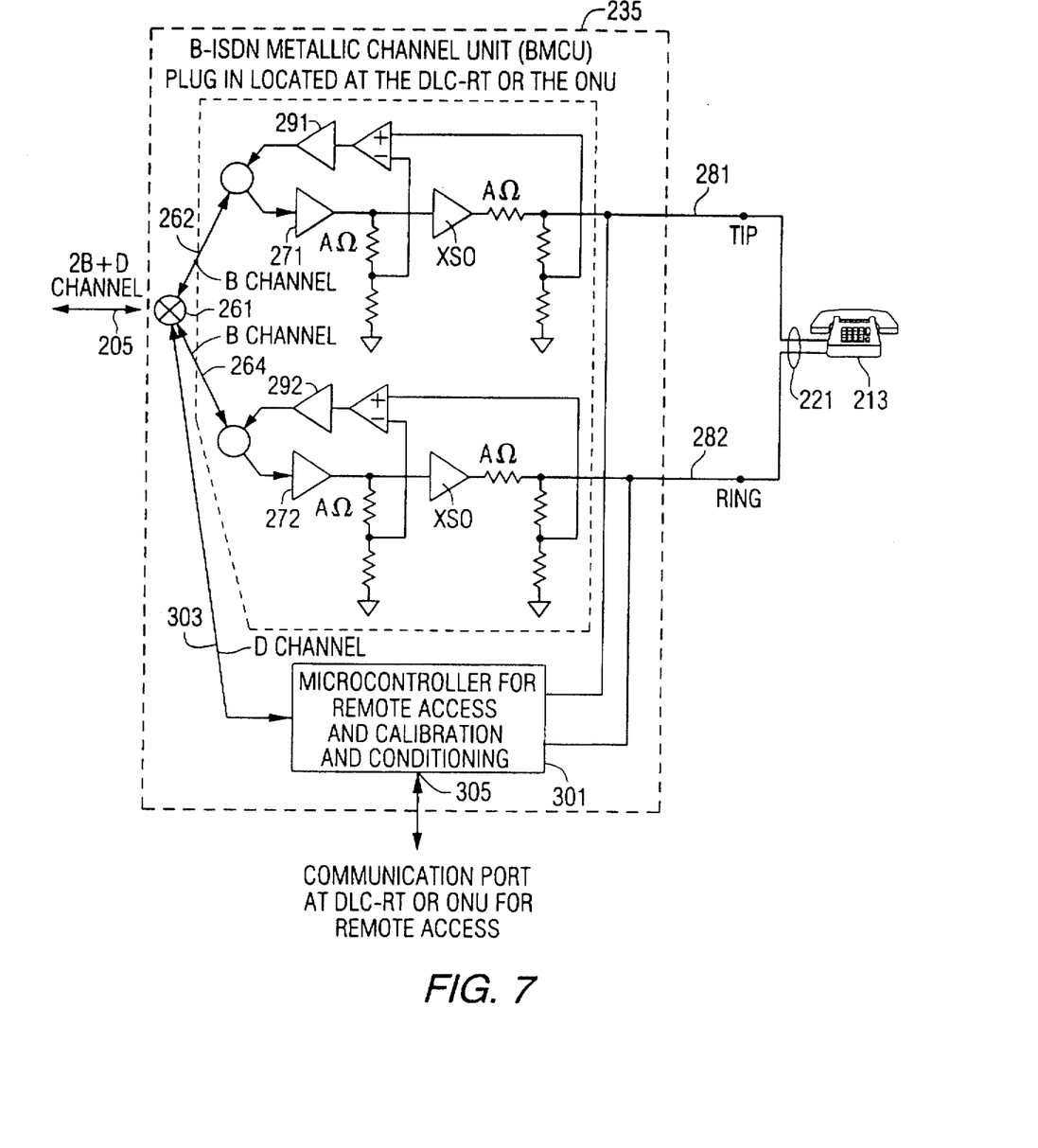
FIG. 7 diagrammatically illustrates the configuration of a B-ISDN metallic channel unit (BMCU).

To provide access to the B-ISDN channel 230, either at a digital loop carrier remote terminal in the case of a network of the type illustrated in FIG. 1, or a broadband network in which subscribers are interfaced with an optical network unit, as illustrated in FIG. 5, a B-ISDN metallic channel unit (BMCU) 235, shown in FIG. 7, to be described, is directly plugged into the (remote terminal or optical network unit) backplane, and incorporates a pair of analog-to-digital and digital-to-analog signal processing interfaces. These analog-to-digital and digital-to-analog signal processing interfaces may be of the type employed by the metallic channel units installed at the DLC-RT in the subsystem described in the above-referenced Kiko '160 and '919 patents, so that all test signalling traffic to and from the central office is, a priori, digitally formatted.

As will be described in detail below, the BMCU 235 receives commands to perform access, calibration and conditioning on the 16 kb/s D channel, responds to digitized stimuli signals received from the central office test system on the 64 kb/s data (B) channel portion of the 2B+D channel 230, and controllably converts these digital signals directly into analog (voltage and current) conditions for application to a designated subscriber line circuit 213. The respective tip and ring pair responses of the line circuit 213 to these digital-to-analog converted stimuli signals are digitized by analog-to-digital conversion circuitry within the BMCU, and sent back to the central office test system 201 over the two 64 kb/s bearer (B) channel portions of the B-ISDN channel 230.

At the central office test system 201, these digital response signals transported by the two ISDN bearer B channels from the BMCU 255 at the remote terminal are coupled directly to tip and ring digital processors 241 and 242 of the central office test system, without the need for intermediate digital-to-analog and analog-to-digital conversion by an associated metallic channel unit at a central office terminal, and that additionally performed by a central office terminal and central office switch, as described earlier, so that the test mechanism of the invention provides a significant improvement in performance, cost and speed. Moreover, since the invention obviates the need for a metallic channel unit in the central office, the absence of a central office terminal backplane in DLC integrated application (which would be a significant problem using the dual metallic channel unit approach of FIG. 4) is of no consequence.

Within the central office test system 201, the tip and ring digital processors 241 and 242 are coupled to a main processor 250, which is programmed with an ISDN basic rate channel assignment for conducting test communications with a remote BMCU. Main processor 250 and associated control logic unit 252 contain the main test system microprocessor, memory, and communications interface to the OSS 225. In addition, an analog interface unit 254 provides for connections to associated no-test trunks (NTTs) and pair gain test controllers currently employed in central offices. This interface also contains conventional analog signalling transport circuitry to support the testing of plain old telephone system (POTS) equipment, in addition to digital telephone (ISDN) components. The main processor 250 maintains a communication link with its associated OSS 225, via a dial up or dedicated data link, and includes associated memory that is updatable remotely, and is preferably programmed to perform self calibration and self diagnostics of the system.

The BMCU 235 is diagrammatically illustrated in FIG. 7 as comprising a B-ISDN channel transceiver 261, respective opto-electronic receiver and electro-optic transmitter components of which are respectively branched via B channel links 262 and 264 to a balanced feedback arrangement of the amplifier converter circuitry, which essentially corresponds to that employed in the metallic channel unit described in the above-referenced '919 patent. Channel inputs 262 and 264 of respective balanced pairs of digital-to-analog converter circuits 271 and 272, respectively associated with the tip and ring leads 281 and 282 of the local subscriber loop, which convert the B-channel digital signals from the test system into the actual voltage values and currents that are applied by the BMCU to tip and ring leads of the subscriber line circuit.

Further coupled in the return paths from the tip and ring leads 281 and 282 are analog-to-digital converter circuits 291 and 292 connected in a balanced configuration with digital-to-analog converter circuits 271 and 272. The BMCU also contains an attendant microcontroller 301, which is coupled through link 303 to the D channel port of transceiver 261. Microcontroller 301 also includes a digital data serial port 305, such as an RS-232 port. The RS-232 port is used to communicate directly with the remote terminal channel bank, so that the BMCU can communicate directly with the DLC-RT to gain 'far-end' access directly; namely, access is made at the remote terminal and no pair gain test controller in the central office is necessary.

As described above, whenever a test is invoked by an OSS command, the telephone number assigned to the BMCU at the DLC-RT or ONU is called by the test system processor 250 and, using the 16 kb/s D-channel portion of the 2B+D channel 230, processor 250 transmits access, calibration and conditioning signals for transport to the metallic channel unit 235 in the downstream DLC-RT or ONU. The digital-to-analog conversion circuitry in the metallic channel unit converts digital signals received by the opto-electronic receiver portion of the fiber optic transceiver of the remote terminal into analog stimulus levels for application to the tip/ring pair 221 of the subscriber line circuit 213.

Electrical test/conditioning response levels of the subscriber line circuit 213 presented to the metallic channel unit 235 via tip/ring pair 221 are coupled to the analog-to-digital conversion circuitry in the metallic channel unit 235, and thereby converted into digital response signals for application to the electro-optic transmitter portion of the fiber optic transceiver of the remote terminal, and transmission therefrom as a pair of 64 kb/s B channel-formatted ISDN data channels over the fiber optic link 205 to the central office. At the central office, since the incoming data 64 kb/s digital data returned over the ISDN B channels is digitally formatted, it does not need intermediate digital-to-analog and analog-to-digital cascade conversion processing prior to being directly applied to the digital signal processors 241 and 242 for analysis.

As will be appreciated from the foregoing description, shortcomings of conventional central office-resident systems for testing and conditioning subscriber line circuits served by a non-metallic (fiber optic) digital communication path-based digital communication network are successfully remedied by the testing arrangement of the present invention, which requires the installation of only a single (basic rate ISDN) metallic channel unit at a remote site terminating the fiber optic communication path, which communicates with a central office test system using an auxiliary B-ISDN communication 'test' channel, that occupies two and a quarter of the DS0 channels of the time division multiplexed communication path used for digital subscriber loop carrier communications. Since digital response signals transported by the two ISDN bearer B channels from the BMCU are coupled directly to tip and ring digital processors in the central office test system, without the need for intermediate digital-to-analog and analog-to-digital conversion by an associated metallic channel unit at a central office terminal, and that additionally performed by a central office terminal and central office switch, the invention provides improvements in performance, cost and speed.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of testing a subscriber line circuit from a central office test system of a central office, said subscriber line circuit being coupled by way of a metallic communication path to a communication path termination site, which terminates a non-metallic communication path from said central office, comprising the steps of:
    (a) providing a metallic channel unit containing analog-to-digital and digital-to-analog conversion circuitry in said communication path termination site, such that said metallic channel unit is coupled to each of said non-metallic communication path and said metallic communication path;
    (b) establishing an integrated services digital network channel between said central office test system and said metallic channel unit; and
    (c) conducting subscriber line circuit test and response digital communications between said central office test system and said metallic channel unit by way of said integrated services digital network ISDN channel, by transmitting a test digital communication from said central office test system to said metallic channel unit by way of a pair of bearer channel portions of said integrated services digital network channel, said test digital communication being representative of a value an electrical stimulus to be applied by said digital-to-analog conversion circuitry of said metallic channel unit to said metallic communication path for said subscriber line circuit, and transmitting a response digital communication from said metallic channel unit to said central office test system by way of said pair of bearer channel portions of said integrated services digital network channel, said response digital communication containing digital signals output by said analog-to-digital conversion circuitry of said metallic channel unit representative of a value an electrical response of said subscriber line circuit to said electrical stimulus applied by said digital-to-analog conversion circuitry of said metallic channel unit to said metallic communication path for said subscriber line circuit.

2. A method according to claim 1, wherein step (c) comprises conducting subscriber line circuit test communications from said central office test system to said metallic channel unit, and conducting subscriber line circuit response communications from said metallic channel unit to said central office test system by way of bearer channel portions of said integrated services digital network channel.

3. A method according to claim 1, wherein said non-metallic communication path comprises a fiber optic link conveying time division multiplexed digital signalling channels associated with a plurality of subscriber line circuits, and wherein said communication path termination site comprises a remote terminal coupled to said metallic communication path.

4. A method according to claim 1, wherein said non-metallic communication path comprises a fiber optic link conveying time division multiplexed digital signalling channels associated with a plurality of subscriber line circuits, and wherein said communication path termination site comprises an optical network unit coupled to said metallic communication path.

5. A method according to claim 1, wherein step (c) comprises digitally processing in said central office test system digital response communications sourced from said metallic channel unit directly from a bearer channel portion of said integrated services digital network channel.

6. A method according to claim 1, wherein step (c) comprises digitally processing in said central office test system digital response communications sourced from said metallic channel unit associated with tip and ring conductors for said subscriber line circuit as conveyed over first and second bearer channel portions of said integrated services digital network channel.

7. A method according to claim 1, wherein step (c) further comprises setting operational parameters of said metallic channel unit by way of a communication path exclusive of said non-metallic communication path.

8. A method according to claim 1, wherein step (c) further comprises conducting access, calibration and control communications with said metallic channel unit at said remote site by way of a data channel portion of said ISDN channel.

9. A method of testing a subscriber line circuit from a central office test system of a central office, said subscriber line circuit being coupled by way of a metallic communication path to a communication path termination site, said communication path termination site terminating a non-metallic communication path from said central office, said non-metallic communication path conveying time division multiplexed digital communication channels, respective ones of which are associated with subscriber line circuits served by said central office, said method comprising the steps of:

(a) providing a metallic channel unit containing analog-to-digital and digital-to-analog conversion circuitry in said termination site, such that said metallic channel unit is coupled to each of said non-metallic communication path and said metallic communication path;

(b) establishing, by way of said non-metallic communication path between said central office test system and said metallic channel unit, an auxiliary integrated services digital network (ISDN) communication channel; and (c) conducting subscriber line circuit test and response digital communications between said central office test system and said metallic channel unit by way of said auxiliary (ISDN) communication channel, by transmitting a test digital communication from said central office test system to said metallic channel unit by way of a pair of bearer channel portions of said integrated services digital network channel, said test digital communication being representative of a value an electrical stimulus to be applied by said digital-to-analog conversion circuitry of said metallic channel unit to said metallic communication path for said subscriber line circuit, and transmitting a response digital communication from said metallic channel unit to said central office test system by way of said pair of bearer channel portions of said integrated services digital network channel, said response digital communication containing digital signals output by said analog-to-digital conversion circuitry of said metallic channel unit representative of a value of an electrical response of said subscriber line circuit to said electrical stimulus applied by said digital-to-analog conversion circuitry of said metallic channel unit to said metallic communication path for said subscriber line circuit.

10. A method according to claim 9, wherein step (c) comprises conducting subscriber line circuit test communications from said central office test system to said metallic channel unit, and conducting subscriber line circuit response communications from said metallic channel unit to said central office test system by way of a pair of bearer channel portions of said integrated services digital network channel.

11. A method according to claim 10, wherein said non-metallic communication path comprises a fiber optic link conveying said time division multiplexed digital signalling channels, and wherein said non-metallic communication path termination site comprises a remote terminal coupled to said metallic communication path.

12. A method according to claim 11, wherein said non-metallic communication path comprises a fiber optic link conveying said time division multiplexed digital signalling channels, and wherein said non-metallic communication path termination site comprises an optical network unit coupled to said metallic communication path.

13. A method according to claim 10, wherein step (c) comprises digitally processing in said central office test system digital response communications sourced from said metallic channel unit directly from a bearer channel portion of said integrated services digital network channel.

14. A method according to claim 10, wherein step (c) comprises digitally processing in said central office test system digital response communications sourced from said metallic channel unit associated with tip and ring conductors for said subscriber line circuit as conveyed over first and second bearer channel portions of said integrated services digital network channel.

15. A method according to claim 9, wherein step (c) further comprises setting operational parameters of said metallic channel unit by way of a communication path exclusive of said non-metallic communication path.

16. A method according to claim 9, wherein step (c) further comprises conducting access, calibration and control communications with said metallic channel unit at said remote site by way of a data channel portion of said ISDN channel.

17. An arrangement for testing a subscriber line circuit from a central office, said subscriber line circuit being coupled by way of a metallic communication path to a communication path termination site, said communication path termination site terminating a non-metallic communication path from said central office, said non-metallic communication path conveying time division multiplexed digital communication channels, respective ones of which are associated with subscriber line circuits served by said central office, said arrangement comprising:

a metallic channel unit disposed at said termination site and containing analog-to-digital conversion circuitry and digital-to-analog conversion circuitry coupled to said non-metallic communication path and said metallic communication path;

said non-metallic communication path between said central office test system and said metallic channel unit including an auxiliary integrated service digital network (ISDN) communication channel; and a central office test system provided at said central office and being operative to conduct subscriber line circuit test and response digital communications with said metallic channel unit by way of said auxiliary (ISDN) digital communication channel; and wherein said central office test system is operative to transmit a test digital communication to said metallic channel unit by way of said bearer channel portions of said integrated services digital network channel, said test digital communication being representative of a value an electrical stimulus to be applied by said digital-to-analog conversion circuitry of said metallic channel unit to said metallic communication path for said subscriber line circuit, and wherein said metallic channel unit is operative to transmit a response digital communication to said central office test system by way of said bearer channel portions of said integrated services digital network channel, said response digital communication containing digital signals output by said analog-to-digital conversion circuitry of said metallic channel unit representative of a value of an electrical response of said subscriber line circuit to said electrical stimulus applied by said digital-to-analog conversion circuitry of said metallic channel unit to said metallic communication path for said subscriber line circuit.

18. An arrangement according to claim 17, wherein said central office test system is operative to transmit subscriber line circuit test communications to said metallic channel unit by way of bearer channel portions of said integrated services digital network channel, and wherein said metallic channel unit is operative to transmit subscriber line circuit response communications by way of said bearer channel portions of said integrated services digital network channel.

19. An arrangement according to claim 18, wherein said non-metallic communication path comprises a fiber optic link conveying said time division multiplexed digital signalling channels, and wherein said communication path termination site comprises a remote terminal coupled to said non-metallic communication path and to said metallic communication path.

20. An arrangement according to claim 18, wherein said non-metallic communication path comprises a fiber optic link conveying said time division multiplexed digital signalling channels, and wherein said communication path termination site comprises an optical network unit coupled to said metallic communication path.

21. An arrangement according to claim 18, wherein said central office test system comprises a digital signal processor which receives and processes digital response communications directly from bearer channel portions of said integrated services digital network channel as transmitted from said metallic channel unit.

22. An arrangement according to claim 18, wherein said central office test system comprises respective digital signal processors, which receive and process digital response communications as conveyed over first and second bearer channel portions of said integrated services digital network channel associated with test responses of tip and ring conductors for said subscriber line circuit, as sourced from said metallic channel unit.

23. An arrangement according to claim 17, wherein said metallic channel unit includes a digital communication port through which operational parameters of said metallic channel unit are set by way of a communication path exclusive of said non-metallic communication path.

24. An arrangement according to claim 17, wherein said central office test system is operative to conduct access, calibration and control communications with said metallic channel unit at said remote site by way of a data channel portion of said ISDN channel.

* * * * *